INVENTORS.
H. B. REED JR.
M. STIMLER

BY

ATTYS.

Feb. 27, 1962 H. B. REED, JR., ETAL 3,023,397
HYDRAULIC PHASE DISCRIMINATOR
Filed Sept. 23, 1957 3 Sheets-Sheet 3

INVENTORS.
H. B. REED JR.
M. STIMLER
BY
ATTYS.

United States Patent Office 3,023,397
Patented Feb. 27, 1962

3,023,397
HYDRAULIC PHASE DISCRIMINATOR
Herbert B. Reed, Jr., Silver Spring, and Morton Stimler, Hyattsville, Md., assignors to the United States of America as represented by the Secretary of the Navy
Filed Sept. 23, 1957, Ser. No. 685,758
8 Claims. (Cl. 340—15)
(Granted under Title 35, U.S. Code (1952), sec. 266)

The invention described herein may be manufactured and used by or for the Government of the United States of America for governmental purposes without the payment of any royalties thereon or therefor.

This invention relates to a novel circuit for use with a hydraulic amplifier or in a device to indicate phase reversal or changes between signals being compared. More precisely, this invention deals with a hydraulic phase discriminator including a plurality of hydraulic rectifiers disposed in a bridge circuit relationship.

Electronic ring modulators analogous to the hydraulic circuitry disclosed herein are not unknown to those skilled in the electronics art and have been extensively used in certain applications. However, while these ring modulators are superior in many respects to the circuitry previously employed, they are cumbersome for application in new, low frequency, hydraulic electrochemical devices, due mainly to component size, weight and cost. In addition they usually have some electric memory of previous signals which is not the case with electrochemical devices.

Accordingly, an object of this invention is to provide a rugged, substantially drift free hydraulic circuit and suitable transducer element for detecting and measuring the phase relation between two incoming signals.

It is another object of this invention to provide an hydraulic device which is capable of discriminating against unintelligible noise in a wide range of signal frequencies.

Still another object is to provide a substantially drift free hydraulic device for discriminating between the phases of two acoustic signals and to indicate the degree of phase mismatch or equality of phase if such is the case.

Yet another object of this invention is the provision of the combination of an hydraulic discriminator and an electrochemical detector capable of detecting weak intelligence signals at high acoustic frequencies.

These and many other objects will become more readily apparent when the following specification is read in conjunction with the attendant drawings wherein like numerals designate like parts throughout and;

Figure 2:
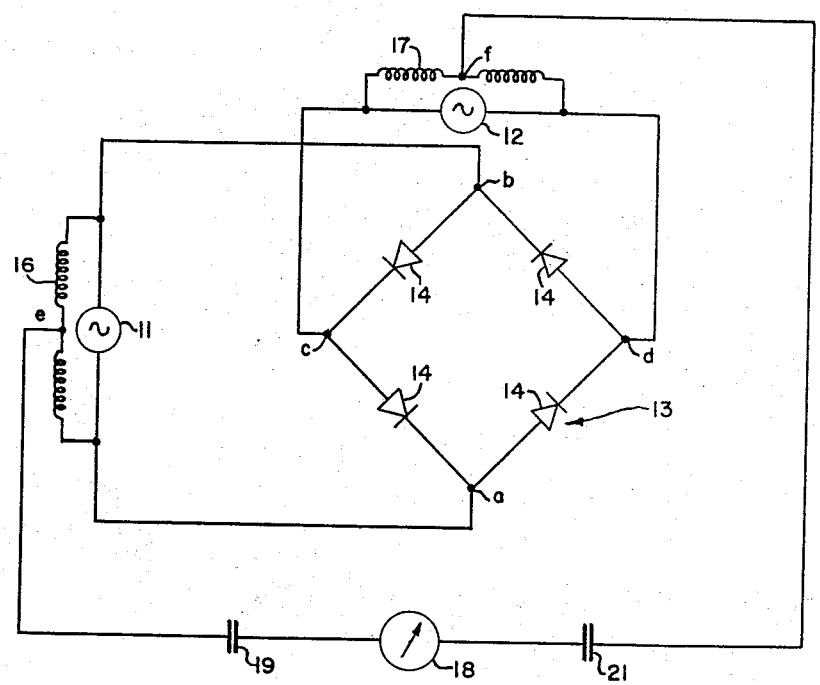
FIG. 2 is a schematic drawing of the electronic circuit analogous to the idealized circuit of FIG. 1.

In order to understand the operation of this device more clearly, reference should now be had to the analogous electronic circuit of FIG. 2, which comprises two sources 11 and 12 each generating a signal which is applied to the network 13 consisting of four rectifiers 14 connected serially in the preferred conductive direction to form a ring modulator circuit.

It is to be understood that the sources 11 and 12 are shown only schematically and that these sources may be transformers, oscillators, transducers, or any suitable arrangement. Inductances 16 and 17 are shunted across the sources 11 and 12 so that the mode of center tapping the respective source may correspond more exactly to that used in the hydraulic circuit of FIG. 1. The signals are applied to the circuit across points $a$, $b$ and $c$, $d$ respectively, while the output of the circuit is derived between center taps $e$ and $f$ of inductances 16 and 17 respectively. As indicated in FIG. 2 the magnitude and direction of the output is measured by a suitable meter or detector 18 having capacitors 19 and 21 serially connected therewith in each leg of the output circuit. Although this arrangement is not necessary nor particularly desirable in the electronic circuit, these capacitors are shown so that the electronic circuit will correspond more nearly to the preferred embodiment of the hydraulic circuit of FIG. 1.

As is well known, the output of the circuit shown in FIG. 2 is characterized in some respects as a multiple of the input signals. While the output is not necessarily equal in magnitude to the numerical product of the signals, the output is a positive pulsating signal if the input signals from 11 and 12 are in phase, is a negative pulsating signal if they are 180° out of phase, zero if either signal is zero and is a pure alternating signal if the signals are in quadrature phase. These relations are indicated in FIGS. 3a to 3d.

Figure 1:
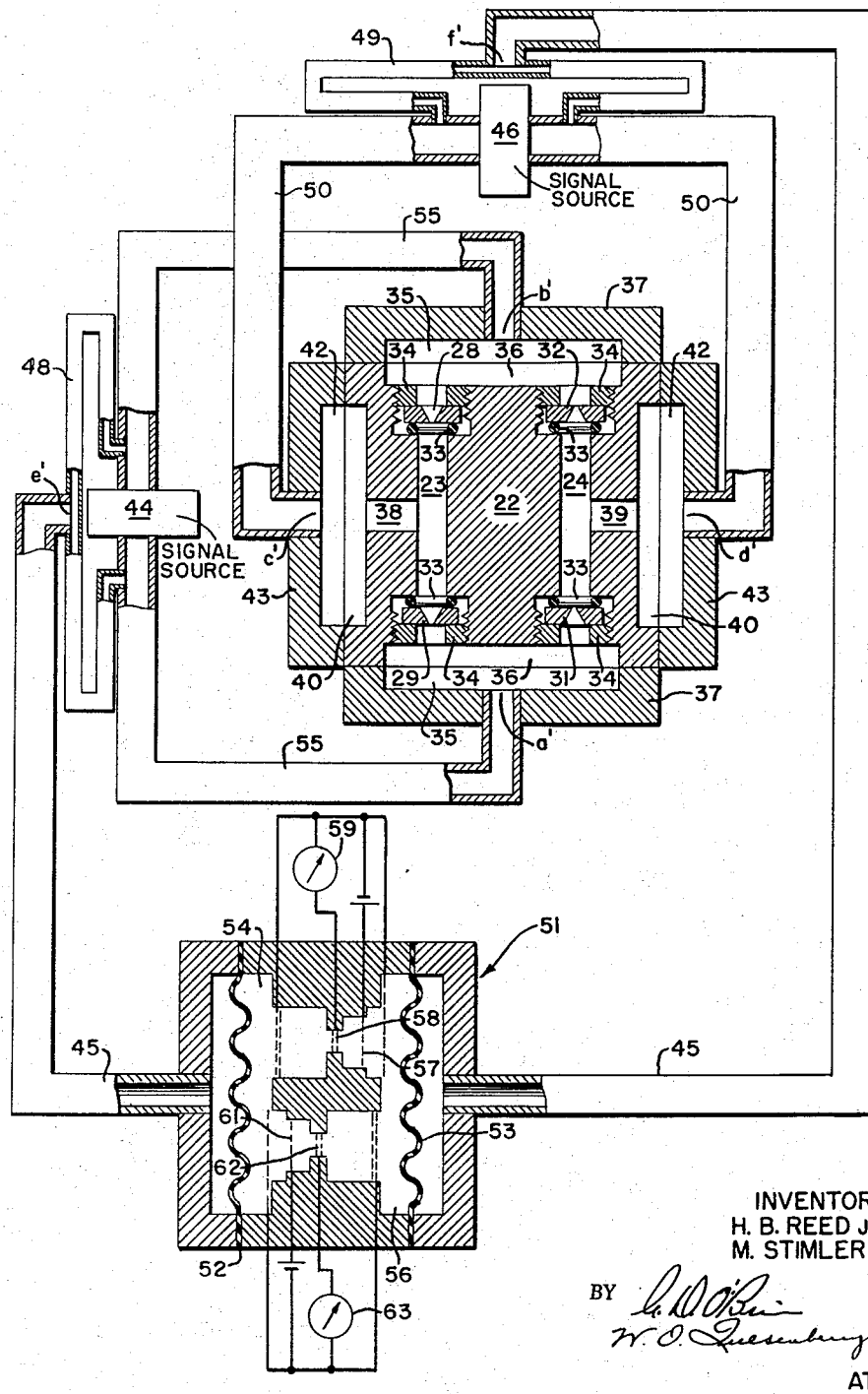
FIG. 1 is a representation of one preferred embodiment of the instant invention partially broken away and showing the rectifier bridge circuit in section.

Referring now to FIG. 1 wherein the hydraulic discriminator is shown in detail, it is seen that the hydraulic rectifier circuit is formed within the body of element 22 by drilling a plurality of holes or bores 23 and 24 therethrough. These bores are counterbored and threaded to receive hydraulic rectifying elements 28, 29, 31 and 32, each of which seats in its respective bore against the O-ring seal 33 disposed at the bottom of the counter bore. If the device is to be used at extremely low pressures, these rectifiers may conveniently be the slit or orifice type described in greater detail in the application of Walter P. Christoph, Ser. No. 564,592, now U.S. Patent 2,856,962.

A hold down nut 34 is threaded into the counter bore to urge the respective rectifying element against the O-rings and an enlarged recess 36 formed within the body 22 at both ends of the bores 23 and 24 and is adapted to match complementary enlarged recesses 35 in the caps 37 which are secured to the surfaces of the block 22 at the end of these bores. A second pair of bores 38 and 39 are formed in opposite sides of the block 22 and each of the bores 38 and 39 intersects one of the bores 23 and 24 midway between the rectifiers disposed in these bores. A second pair of enlarged recesses 40 are formed adjacent to the ends of these last named bores for alignment with complementary recesses 42 in covers or caps 43. Each of the covers is provided with a fitting to connect externally the rectifier circuit to the hydraulic signal sources which may be any device suitable for the purpose such as a geophone, hydrophone, a pulsating diaphragm, or piezoelectric element. It is to be understood, of course, that the piping and conduits 45, 50 and 55 in the system are as short as possible and have large internal diameters to decrease the hydraulic resistance and thereby minimize pipe losses and attendant signal attenuation.

The provision of the enlarged recesses in the body 22 and the respective covers allow the assembly to be quickly disassembled and reassembled without slight misalignment of the cover causing projections into the flow path which would induce excessive flow resistance in the circuit. When thus connected, the points $a'$ and $b'$, $c'$, $d'$, $e'$, and $f'$ correspond to the points $a$, $b$, $c$, $d$, $e$, and $f$ respectively, of the electronic circuit shown in FIG. 2. A center tap of the signal sources 44 and 46 is provided by including inertance elements 48 and 49 across their respective sources. These inertances are analogous to the inductances 16 and 17 of FIG. 2 and are preferably composed of a long length of relatively small diameter pipe which presents an hydraulic impedance analogous to the electrical impedance of the inductances of the electronic circuit. The output signal is derived across the center tap of inertances 48 and 49 by an hydraulic flow detector 51. One preferred form of the detector is an electrochemical, reactive ion containing cell which measures hydraulic pressure fluctuations in the system by flexure of diaphragms 52 and 53 corresponding to capacitors 19 and 21 in the electronic analog. It is to be understood that the electrochemical detector shown is only one of several detectors available suitable for practicing this invention and the invention is not limited to any particular type of detector. Flexure of diaphragms 52 and 53 causes flow of the reactible ions contained within compartments 54 and 56 of the detector which result in electric current flow between anode 57 and cathode 58 and through meter 59 when the hydraulic pressure fluctuations flex the diaphragms in such a manner as to force the reactive fluid (the fluid containing the reactive ions) to flow from left to right through the cells, and to cause current between anode 61 and cathode 62 and through meter 63 when the reactive ion flow is in the opposite direction. The detector cell per se forms no part of this invention and is not described in detail herein. However, a typical electrochemical cell suitable for use in practicing this invention is more fully described in the copending application of H. B. Reed and N. N. Estes, Ser. No. 668,575, now U.S. Patent No. 2,896,095.

If one of the sources 44 or 46 generates a signal of known frequency and phase, the phase relations between it and the other signal generators may be quickly determined by employing this device. On the other hand it is sometimes desirable to indicate and utilize phase reversals between two signals of equal but unknown frequency as for example in certain ordnance applications.

Figure 4:
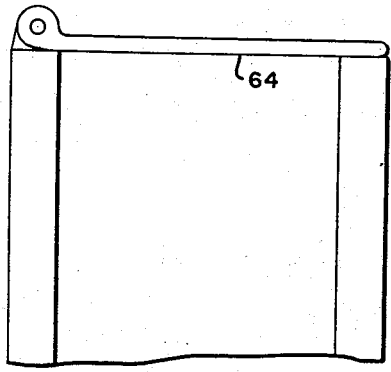
FIG. 4 is a representation of a second embodiment of a rectifier suitable for use in the ring conducting modulator bridge circuit of FIG. 1.

This invention having a plurality of hydraulic rectifiers connected in a bridge circuit is peculiarly suited for that type of application because the range of frequencies over which this device is able to operate is more extensive than the operating range of previous hydraulic devices. It should be understood, however, that at very low pressures of the order of a few dynes/cm.² this circuit cannot be as efficient as its electric electronic analog since the resistance to flow in the rearward direction through the slit or orifice type hydraulic rectifier is a finite value while in the electronic rectifier the resistance in the rearward direction may be assumed to be infinite for all practical purposes. At pressures of several p.s.i., the rectifiers may take the form of a low innertia flap valve 66 indicated in FIG. 4 which would of course have very high resistance to flow in the backward direction. At the same time, however, the resistance to flow in the forward direction is rather high initially since the flap 64 of the valve must be moved to the open condition by the force of the water in the rectifier circuit.

Figure 5:
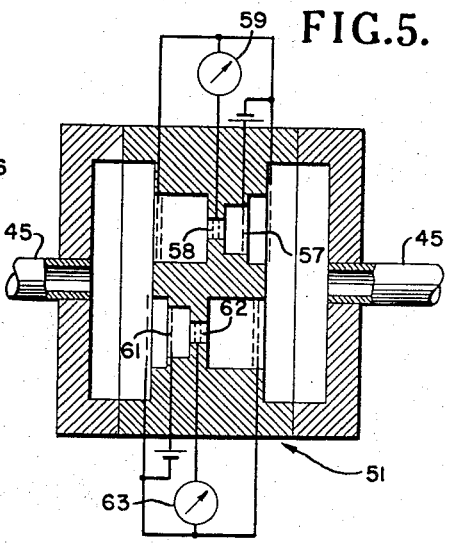
FIG. 5 is another embodiment of this invention wherein the detector cell does not include any diaphragms.
Figure 3A:
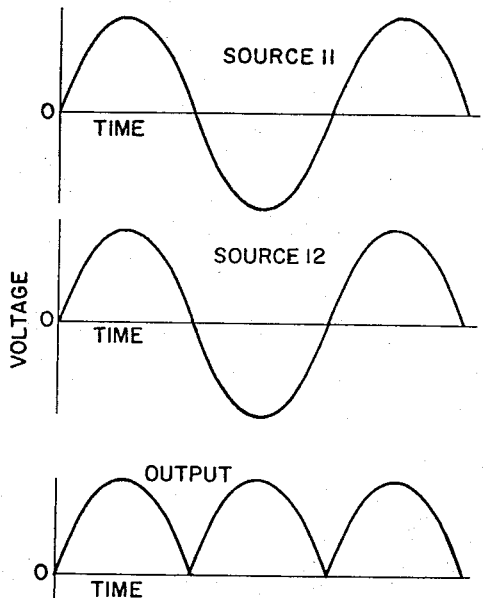
FIGS. 3a to 3d illustrate the characteristic output curves of the device at various points in the network.
Figure 3C:
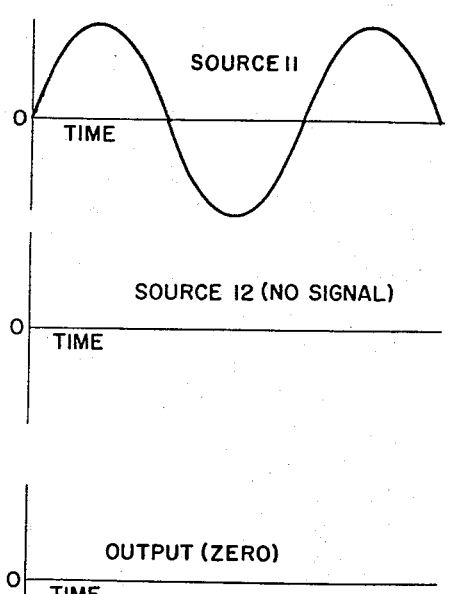
Figure 3B:
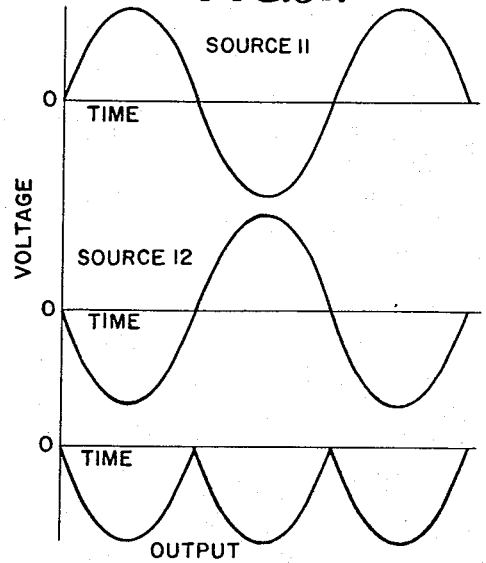
Figure 3D:
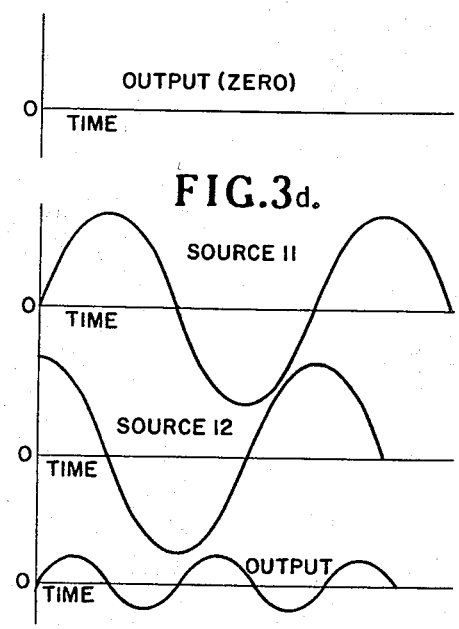

In the modification shown in FIG. 5 the diaphragms 52 and 53 are omitted thereby preventing the occurrence of spurious signals that might be generated by the diaphrams as they resume their undeflected positions if the original deflection by the fluid pressure in the piping 45 were substantial. In this embodiment it is necessary to fill the whole system with reactive solution so that the particle flow of the fluid may be detected. This results in a problem because the reactive solution must be maintained extremely pure; even minute amounts of impurities picked up elsewhere in the system, have detrimental effects on the operation of the detector. Furthermore, typical active solutions have a corrosive effect on common materials suitable for fabrication of the rectifier, thereby necessitating the use of platinum in the rectifier in some cases to prevent impurities resulting from corrosion from entering the solution. Accordingly, this embodiment is apt to be several times more expensive than the first embodiment but eliminates the possibility of spurious signals being received by the detector.

Although this invention has been shown in but a few embodiments, it should be obvious to those skilled in the art that it is not so limited but is susceptible of many alterations without departing from the spirit thereof. Therefore, this specification is not to be construed as limiting this invention in any manner, rather the scope of the appended claims only should be used to deliniate the boundaries of this invention.

What is claimed as new and desired to be secured by Letters Patent of the United States is:

1. A circuit comprising in combination; a plurality of hydraulic rectifiers disposed in a bridge circuit characterized by having each rectifier serially connected in the preferred conductive direction, a pair of signal producing means connected across diametric junctions of said bridge circuit for applying hydraulic signals to the bridge circuits, the signal produced by one of said signal producing means being of known frequency and phase and the signal produced by the other of said signal producing means being of unknown phase and frequency, a plurality of inertance means each having a center tap and each connected in shunting relation to one of said signal producing means, and means connected to said center taps for deriving an output signal correlative to the differences in the phases of the signals applied to said bridge circuit by said signal producing means.

2. A product circuit including in combination, a plurality of hydraulic rectifiers disposed in a ring conducting modulator bridge characterized by a respective one of said rectifiers in each bridge leg, means for applying a pair of hydraulic signals across diametric junctions of said bridge, and means hydraulically connected to said bridge for deriving an hydraulic output proportional to the product of said signals.

3. A phase discriminator circuit including in combination; a plurality of hydraulic rectifiers disposed in a ring conducting bridge characterized by a respective one of said rectifiers in each bridge leg, means for applying a pair of hydraulic signals of equal frequency and unknown phase relationship across diametric junctions of said bridge, and means operatively connected to said last named means for deriving a third hydraulic signal from said discriminator circuit indicative of the phase reversals between the pair of hydraulic signals.

4. An hydraulic circuit comprising in combination; a bridge circuit including a plurality of hydraulic rectifying devices disposed in said bridge circuit and with each device being serially connected in the preferred conductive relation; a pair of hydraulic signal producing means connected across opposite junctions of said bridge circuit, one of said pair of means producing a signal of known phase and frequency and the other of said pair of means producing a signal of unknown phase and frequency, a pair of inertance elements each having a center tap and respectively connected across said signal producing means, and a pair of conduits each connected to a respective one of said center taps, and means disposed within said conduit for indicating the direction of fluid flow in said conduit thereby to indicate the phase differences of the signals produced by said hydraulic signal producing means.

5. The circuit of claim 4 wherein each of the hydraulic rectifier elements comprises an apertured element having a low resistance to flow in the preferred conductive direction and a relatively high resistance to fluid flow in the opposite direction.

6. The circuit of claim 4 wherein the rectifier elements each includes a low inertia flapper valve.

7. An hydraulic discriminator circuit comprising in combination; continuous fluid conduit means, a plurality of hydraulic rectifier elements disposed in said continuous fluid conduit means and each of said elements being serially connected in the preferred conductive direction, a first hydraulic signal producing means connected across said continuous fluid conduit means, second hydraulic signal producing means connected across said continuous conduit means and hydraulically separated from said first hydraulic signal producing means by at least one rectifying element within said conduit means, a plurality of inertance elements each having a center tap and connected in shunting relation to each of said signal producing means, a pair of conduits respectively connected to the center taps of said inertance means, an electrochemical flow detector, each conduit connected to said electrochemical flow detector to provide an electrical output signal correlative to the differences in the phases of signals applied to said circuit by said signal producing means.

8. An hydraulic phase discriminator comprising in combination, a continuous conduit substantially filled with a liquid, a plurality of hydraulic rectifiers disposed therein to provide only one preferred direction of fluid flow through said conduit, a pair of hydraulic signal producing means each hydraulically connected across said continuous conduit so that each connection is separated from every other connection by a rectifying element, one of said signal producing means producing a signal of known phase and frequency and the other of said signal producing means producing a signal of unknown phase and frequency, a plurality of inertance elements each having a center tap hydraulically connected in shunting relation to a respective one of said signal producing means, a pair of liquid filled conduits each connected to a different one of said center taps, and an electrochemical flow detector including a first cell fluidly connected with one of said last named conduits and a second cell fluidly connected with the other of said last named conduits for providing an electrical output correlative to the phase difference of signals by said hydraulic pressure signal producing means.

References Cited in the file of this patent

UNITED STATES PATENTS

| | | |
|---|---|---|
| 2,220,098 | Guanella | Nov. 5, 1940 |
| 2,390,252 | Hayward | Dec. 14, 1945 |
| 2,571,557 | Fortier | Oct. 16, 1951 |
| 2,799,829 | Gordon | July 16, 1957 |
| 2,824,292 | Christoph | Feb. 10, 1958 |